United States Patent Office 3,428,414
Patented Feb. 18, 1969

3,428,414
PROCESS FOR REMOVING NITRIC OXIDE FROM GASEOUS MIXTURES
Werner H. Baum, Monroeville Borough, Allegheny County, Joseph G. Crist, Mount Lebanon Township, Allegheny County, and Elliott V. Nagle, Franklin Township, Westmoreland County, Pa., assignors to United States Steel Corporation, a corporation of Delaware
No Drawing. Filed June 2, 1966, Ser. No. 554,685
U.S. Cl. 23—2  9 Claims
Int. Cl. C01b 21/40, 21/46

The present invention relates to the removal of nitric oxide (NO) from gaseous mixtures. The invention is concerned with the removal of NO from gaseous mixtures containing oxygen and reactive organic material, more particularly, coke-oven gases or the like.

The NO present as a contaminant in coke-oven gas or the like is known to react with oxygen and other organic material to form complex materials, usually called gums. Gums cause clogging of equipment and pipe lines. Gums that form in apparatus for the cryogenic separtion of gaseous mixtures are known to cause explosions.

It is known to convert or remove NO in these gases by the oxidation thereof to nitrogen dioxide ($NO_2$). Any $NO_2$ that is formed ordinarily reacts immediately with reactive organic material to form organic-nitrogen-oxygen compounds. This gummy, complex nitrogeneous organic material tends to precipitate from the gas and may be removed together with any remaining $NO_2$ by known methods, for example, by wet or dry scrubbing. Hence, the troubles may be avoided that occur when gum is allowed to form and accumulate where it will. This may be done by causing gum to form where it is innocuous and may be conveniently removed from the system.

In general, such a process for treating a gas mixture to oxidize NO to $NO_2$ and form organic-nitrogen-oxygen compounds comprises retaining the gas mixture for a short time in a reaction chamber at an elevated temperature, for example, at a temperature between about 60° and 90° C. The reactions involved and the formed organic-nitrogen-oxygen compounds are complex. Perhaps for these reasons the process has been found to be sluggish or non-operative with some gas mixtures. The process may even cease altogether for no apparent reasons. A number of suggestions have been made to render the process more reliable. For example, it has been proposed to subject the gas to a brush discharge or to irradiation with a high-pressure mercury-vapor lamp.

We have now found another way to make this process more reliable with respect to initiating and sustaining the reaction or reactions to insure NO removal or conversion. According to our invention, a small quantity of an $NO_2$-containing gas is admixed with the particular gas containing NO, oxygen and reactive organic material. The admixture is then flowed through a heated reaction chamber and is allowed to reside therein for a short time at a temperature between about 50° and 110° C. Alternatively, $NO_2$ may be injected into the chamber to admix with the gas slowly flowing therethrough. The chamber need not be heated, however, where the inlet gas temperature maintains the admixture in the chamber between about 50° and 110° C.

We have found by adding $NO_2$ continuously to the flowing gas, the reactions that eliminate NO are catalyzed or initiated rather quickly and are sustained. Since it is known that $NO_2$ reacts quite rapidly with the constituents in coke-oven gas, for example, those skilled in the art could reason that any $NO_2$ added to the gas should disappear rapidly and have no effect on the rate of NO conversion. Surprisingly, we have found this is not the case.

Our process may be operated within the following limits or ranges. As indicated above, the temperature in the reaction chamber may vary between about 50° and 110° C., the preferred range being between about 60° and 100° C. Below 50° C. and above 110° C. the conversion of NO to $NO_2$ gradually decreases. We have found that at 140° C. the conversion rate is very low.

The concentration of $NO_2$ for substantially complete (90%) elimination of NO may vary between about 40% and 80% of the concentration of NO. That is, the volume ratio of $NO_2$ to NO may vary between about .40 and .80 to rapidly initiate and sustain NO elimination at the optimum conditions of temperature and residence time. As the ratio approaches .40 and decreases to about .30, the residence time should be on the high side of its range. Increasing the residence time therebeyond is satisfactory for treating small volumes, but becomes more uneconomical as the gas volume increases. Likewise, below a ratio of .30 to about .06, the reaction chamber may require conditioning or preparation for sustained, optimum NO elimination. While we do not know the mechanism involved, conditioning may be provided by passing the gas through the elevated-temperature reaction chamber for some time, which may be more than an hour. Above a ratio of .80 to about 1.00, NO elimination improves somewhat. Beyond a raio of 0.80 and the added $NO_2$ cost should be balanced against higher NO conversion.

An $NO_2$-containing gas useful in our process may be $NO_2$ itself or a gas such as nitrogen tetroxide, a mixture comprising $NO_2$ in equilibrium with $N_2O_4$. In any event, sufficient gas should be used to provide the required concentration of $NO_2$.

In the known oxidation reaction of NO to $NO_2$ it has been stated that at least 0.1% oxygen by volume should be present. We have operated our process satisfactorily in a range between about 0.19% and 5% oxygen by volume. For example, at substantially the same optimum temperature and residence time and at an $NO_2$/NO ratio between about 0.34 and 0.38, the NO conversion was 76% with 0.19% oxygen and 97% with 1.1% oxygen by volume.

A great number of materials are known to react with $NO_2$, or interact with NO and oxygen, under the conditions of temperature and pressure suitable for an NO conversion process such as ours. It is to be understood that the term reactive organic material as used throughout this specification and the claims includes effective materials, such as dienes, conjugated dienes, unsaturated hydrocarbons and hydrocarbons, that react with oxygen, NO and $NO_2$ to form complex organic-nitrogen-oxygen compounds. For example, just one paper discusses more than thirty compounds in the above categories found to react with $NO_2$ to form gum [C. W. Jordan, A. L. Ward and W. H. Fulweiler, "Gum Deposits in Gas Distribution Systems, Vapor Phase Gum," Industrial and Engineering Chemistry 26, 947 (1934)]. Of the known compounds, all we have tested have been found effective, including 1,3-butadiene, cyclohexene, cyclopentadiene and m-xylene. Our process requires a minimum concentration by volume of reactive organic material. For example, we have operated our process satisfactorily with 150 parts per million (p.p.m.) by volume of 1,3-butadiene. Other conditions remaining constant, we have found that an increase in the 1,3-butadiene concentration from 150 p.p.m. to 200 p.p.m. increased NO conversion from about 80% to about 90%. The reactive organic material found in coke-oven gas or the like is usually in excess of minimum requirements but may, of course, be increased in accordance with our teachings.

Our process operates successfully when an $NO_2$-enriched gas resides for a short time in an elevated temperature reaction chamber. We have found a time between about 8 seconds and 16 seconds to be satisfactory. Below about 8 seconds the NO elimination decreases quite rapidly. When a gas takes longer than 16 seconds to traverse a heated chamber the NO elimination is improved, as discussed above with respect to the $NO_2/NO$ ratio. The capital cost increases, however, since a larger chamber must be provided.

Our process is applicable to gases containing NO, for example, those resulting from high temperature reactions where air has been present. The carbonization of coal and resulting coke-oven gas is but one example. Other gases include crude synthesis gases obtained by partial oxidation of natural gas, crude oil, coal, refinery gas, naphtha or gas oil. A gas may contain NO, due to the raw materials used or due to its processing. Many of these gases are subjected to low-temperature operations or cryogenic separation requiring prior removal of NO. Naturally, or due to processing prior to NO removal, these gases may not have the preferred concentrations of oxygen and reactive organic material. Surprisingly, some $NO_2$ may be present. It is evident from the above description, however, that any deficiency in $NO_2$, oxygen or reactive organic material may be corrected prior to NO conversion according to our process.

We prefer to construct the reaction chamber of carbon steel rather than stainless steel. Under the varying conditions described above, we have found that with carbon steel as opposed to stainless steel, the reaction is initiated more rapidly. Any required chamber conditioning is more rapid. Where operating conditions change, the reaction stabilizes itself more rapidly. It should be pointed out, however, that with an extended chamber-conditioning period, but with otherwise optimum conditions, an NO elimination of about 86% was obtained with a stainless steel chamber at an $NO_2/NO$ ratio of about 0.06. Hence, where a gas corrosive to carbon steel must be treated, a stainless steel chamber may be more satisfactory.

A complete understanding of the invention may be obtained from the following typical examples.

Examples 1–4

A gas representative of a hydrogen-rich, tail gas fraction of coke-oven gas, from which hydrogen is recovered by a liquefaction process, comprised by volume 0.0012% (12 p.p.m.) NO, 5.0% oxygen, 0.24% 1,3-butadiene, 28.7% methane, 2.7% nitrogen, 6.4% carbon monoxide and the remainder hydrogen. Admixed therewith was 0.00044% (4.4 p.p.m.) $NO_2$ representing an $NO_2/NO$ ratio of 0.37. At atmospheric pressure, the admixture was passed through a heated reaction chamber comprising a Pyrex glass tube having a volume of 117 ml. Heated to about 44° C., the residence time of the admixture was 15 seconds. The admixture out of the tube analyzed 3.8 p.p.m. NO for an NO conversion of 68%. Example 1 was repeated as Examples 2–4, only the temperature being changed. The results are summarized in Table I.

TABLE I

| Example | Temperature, °C | Gas out of Tube | |
|---|---|---|---|
| | | NO, p.p.m. | NO Conversions, percent |
| 1 | 44 | 3.8 | 68 |
| 2 | 54 | 1.8 | 85 |
| 3 | 88 | 0.4 | 97 |
| 4 | 100 | 3.8 | 68 |

It may be seen from the above examples that NO may be converted and removed from a gas containing it by admixture therewith of $NO_2$ in an $NO_2/NO$ ratio of 0.37. In the absence of $NO_2$, very little NO was converted.

Examples 5–12

Another gas representative of a hydrogen-rich fraction of coke-oven gas was treated at 155 pounds per square inch gage (p.s.i.g.) in an apparatus comprising a heated reaction chamber connected by tubing to a packed chamber. The heated chamber was a carbon steel tube having an inside diameter of 1 1/32 inch and a capacity of 100 ml. The packed chamber was a stainless steel tube having an inside diameter of 1.8 inches and a capacity of 300 ml. It was packed with quartzite stones so that the void space was about 150 ml. The chambers were connected by about two feet of 1/4 inch stainless steel tubing, wherein the gas usually cooled to about room temperature. Simultaneous gas samples could be taken before and after the heated chamber and after the packed chamber. The gas comprised, by volume 6.9% nitrogen, 6.5% carbon monoxide, 28.9% methane, 0.5% oxygen, 200 p.p.m. 1,3-butadiene and the balance hydrogen. Rotameters were used to control the residence time and the content of NO and $NO_2$. In Example 5, the gas was heated to 75° C. in the heated chamber and took about 10.7 seconds to traverse the chamber before traversing the tubing and packed chamber. The gas flowing to the heated chamber contained $NO_2$ and NO. After an elapsed time of one hour at approximately constant conditions the gas to the heated chamber contained 0.89 p.p.m. $NO_2$ and 1.12 p.p.m. NO for an $NO_2/NO$ ratio of 0.79. A sample taken at the same time, after the packed chamber, showed 0.08 p.p.m. NO for an NO conversion of 93%. Simultaneous samples were thereafter taken at 5.5, 8.7 and 9.2 hours, the elapsed times after the beginning of the test.

The general procedure described in Example 5 was repeated for Examples 7–12, but with varying operating conditions. In Example 6 the injection of $NO_2$ was stopped and the NO content of the gas was raised to 2.14 p.p.m. The NO removal or conversion stopped. After four hours at these conditions the gas after the packed chamber contained 2.14 p.p.m. NO, there being no conversion thereof. The operating conditions in each example were maintained as constant as possible. The operating conditions and test results obtained are summarized in Table II.

TABLE II

| Example | Heaten Reaction Chamber | | Elapsed Time at Conditions, hours | Test Period Data | | | | |
|---|---|---|---|---|---|---|---|---|
| | Temperature, °C | Residence time, seconds | | Gas Into Heated Chamber | | | After Packed Chamber | |
| | | | | $NO_2$ p.p.m | NO, p.p.m | $NO_2/NO$ Ratio | NO, p.p.m | NO Conversion percent |
| 5 | 75 | 10.7 | 1 | 0.89 | 1.12 | 0.79 | 0.08 | 93 |
| | | | 5.5 | 0.64 | 1.15 | 0.56 | 0.11 | 91 |
| | | | 8.7 | 0.64 | 1.13 | 0.57 | 0.12 | 89 |
| | | | 9.2 | 0.65 | 1.05 | 0.62 | 0.11 | 90 |
| 6 | 75 | 10.7 | 4 | 0.0 | 2.14 | | 2.14 | 0 |
| | | | 0.67 | 0.70 | 0.93 | 0.75 | 0.34 | 63 |
| 7 | 75 | 12.7 | 3.33 | 0.70 | 0.89 | 0.79 | 0.0 | 100 |
| | | | 6.0 | 0.70 | 0.82 | 0.85 | 0.0 | 100 |
| | | | 6.1 | 0.70 | 0.68 | 1.03 | *0.12 | *82 |
| 8 | 75 | 14 | 1 | 0.46 | 1.17 | 0.39 | 0.10 | 91 |
| 9 | 110 | 12 | 1.5 | 0.58 | 1.59 | 0.36 | 0.80 | 50 |
| | | | 3.5 | 0.43 | 1.04 | 0.41 | 0.40 | 61 |
| 10 | 50 | 9.2 | 1 | 0.64 | 1.55 | 0.41 | 1.18 | 24 |
| 11 | 50 | 14 | 2.25 | 0.77 | 1.34 | 0.58 | 0.50 | 63 |
| 12 | 60 | 14 | 1.5 | 0.77 | 1.31 | 0.59 | 0.20 | 85 |

* NO test results from sample taken after heated reaction chamber.

It may be seen from the above examples that Example 5 illustrates some conditions we have found to be optimum in our preferred operating ranges for 90% conversion of NO. Example 6 shows that in the absence of $NO_2$ it was not possible to convert NO. Example 7 illustrates 100% NO conversion by providing a greater $NO_2$/NO ratio and a somewhat longer residence time than in Example 5. After 6.1 hours, simultaneous samples were taken before and after the heated chamber. Conversion in the heated chamber was 82% with further conversion taking place when the gas was thereafter retained for a short time at a temperature below its temperature in the heated chamber. The packed chamber simulated any processing equipment that may be used for reaction completion and/or to remove reaction products from a gas, for example, a liquid or dry scrubber or a chamber which may also serve as a surge tank ahead of a liquefaction step. Depending on such factors as the extent of NO conversion required, changes in gas composition or changes in operating conditions, it is possible to achieve the benefits of our process by using only a heated chamber or by supplementing this chamber with known means that provide time for reaction completion as well as removal of reaction products.

Examples 8–12 illustrate operation at the low side of the preferred range of $NO_2/NO$ ratios, and the effect of changes in temperature and residence time. Example 8 shows that with an $NO_2/NO$ ratio of 0.39, an NO conversion of 91% was obtained when the residence time was increased to the high side of this preferred range at 14 seconds. Example 9 illustrates that at 110° C., the NO conversion dropped to 50% at an $NO_2/NO$ ratio of 0.36, but increased to 61% when the $NO_2/NO$ ratio was increased to 0.41. Example 10 illustrates that a 50° C. and a residence time of 9.2 seconds the NO conversion dropped to 24% at an $NO_2/NO$ ratio of 0.41. When the Example 10 conditions were changed by increasing the residence time and $NO_2/NO$ ratio, the conversion increased to 63% as illustrated by Example 11. When the Example 11 conditions were changed by increasing the temperature to 60° C., the NO conversion increased to 85% as illustrated by Example 12.

While the above examples illustrate preferred methods and conditions of operation within our broad operating limits, it is obvious therefrom that changes may be made therein without departing from the spirit of the invention. It will be apparent that, for commercial operation of our process, the hereinabove described equipment may be of any design known to effect the desired results.

Although we have disclosed herein the practice of our invention, we intend to cover as well any changes or modifications therein which may be made without departing from the spirit and scope of the invention.

We claim:
1. In a process for the removal of nitric oxide from a gas mixture containing oxygen and reactive organic material, including retention of the gas mixture for a short time in a reaction chamber at an elevated temperature, the improvement comprising retaining said gas mixture in said chamber in admixture with a gas containing nitrogen dioxide, the volumetric ratio of nitrogen dioxide to nitric oxide being at least about 0.06.
2. The process of claim 1 wherein said ratio is at least about 0.30.
3. The process of claim 1 wherein said ratio is between about 0.30 and 1.00.
4. The process of claim 1 wherein said admixture is retained in said chamber at a temperature between about 50° and 110° C.
5. The process of claim 1 wherein said admixture is retained in said chamber for at least about 8 seconds.
6. The process of claim 1 wherein said admixture comprises at least about 0.1 percent oxygen by volume.
7. The process of claim 1 wherein said admixture comprises by volume at least about 150 parts per million of a reactive organic material.
8. The process of claim 1 wherein said admixture is thereafter retained for a short time at a temperature below the temperature of said admixture in said chamber.
9. The process of claim 1 wherein said gas mixture comprises a hydrogen-rich fraction of coke-oven gas.

References Cited

UNITED STATES PATENTS

| | | | |
|---|---|---|---|
| 3,192,009 | 6/1965 | Grosspietsch et al. | 23—3 |
| 3,262,751 | 7/1966 | Dols | 23—2 |

OSCAR R. VERTIZ, *Primary Examiner.*

EARL C. THOMAS, *Assistant Examiner.*

U.S. Cl. X.R.

23—159